US009889798B1

(12) United States Patent
Cong et al.

(10) Patent No.: US 9,889,798 B1
(45) Date of Patent: Feb. 13, 2018

(54) DETECTION OF A TARGET OBJECT UTILIZING AUTOMOTIVE RADAR

(71) Applicant: Autoliv ASP, Inc., Ogden, UT (US)

(72) Inventors: Shan Cong, Superior Township, MI (US); Bei Yan, Farmington Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 15/253,343

(22) Filed: Aug. 31, 2016

(51) Int. Cl.
G01S 13/66 (2006.01)
B60Q 9/00 (2006.01)
G06N 7/00 (2006.01)
G01S 13/93 (2006.01)
G01S 13/88 (2006.01)

(52) U.S. Cl.
CPC .............. *B60Q 9/008* (2013.01); *G01S 13/66* (2013.01); *G01S 13/886* (2013.01); *G01S 13/931* (2013.01); *G06N 7/00* (2013.01)

(58) Field of Classification Search
None
See application file for complete search history.

(56) References Cited

U.S. PATENT DOCUMENTS 7,978,096 B2   7/2011  Reed et al.
8,072,352 B2 * 12/2011 Reed ..................... G01S 13/931
                                                                340/435

(Continued)

FOREIGN PATENT DOCUMENTS

WO    2010013542    2/2010
WO    2010045626    4/2010

OTHER PUBLICATIONS

International Search Report and Written Opinion dated Dec. 14, 2017 in corresponding PCT Application No. PCT/US2017/049416, International Filing Date: Aug. 30, 2017, 15 pages.

*Primary Examiner* — Fekadeselassie Girma
(74) *Attorney, Agent, or Firm* — Burns & Levinson, LLP; Steven M. Mills

(57) ABSTRACT

Systems and methods are presented herein for improved cross-path detection between a host vehicle and a target object. In general, the cross-path angle by solving a multiple hypothesis problem characterized by independent calculations across a first plurality of time points, the multiple hypothesis problem supposing a plurality of possible cross-path angle solutions, each cross-path angle solution representing a corresponding possible trajectory for the target object. Advantageously, a cross-traffic alert or other feedback may be triggered based at least partially on whether the target object is within a region of interest, wherein the region of interest is determined at least in part based on the estimated cross-path angle. In some embodiments the cross-path angle may be determined by selecting a cross-path angle solution from the plurality of possible cross-path angle solutions which minimizes a variance between results of the independent calculations across the first plurality of time points. Other feature disclosed herein include, determining an estimate for the cross-path angle for each of a plurality of trackings of the target object, wherein each tracking is characterized by a different set of two or more time points. This may advantageously enable, determining a change in trajectory of the target object based on variance between cross-path angle estimates.

25 Claims, 5 Drawing Sheets

(56) References Cited

U.S. PATENT DOCUMENTS

| | | | | |
|---|---|---|---|---|
| 8,552,848 B2* | 10/2013 | Rao | ............... | B60Q 9/006 |
| | | | | 340/435 |
| 8,554,465 B2* | 10/2013 | Schoenherr | ......... | B62D 15/027 |
| | | | | 340/932.2 |
| 8,600,606 B2* | 12/2013 | Nickolaou | ........ | B60W 30/0953 |
| | | | | 342/70 |
| 8,823,550 B2* | 9/2014 | Pampus | ................ | B60Q 9/006 |
| | | | | 340/3.41 |
| 8,952,799 B2* | 2/2015 | Irrgang | ............. | B60W 30/0956 |
| | | | | 340/435 |
| 9,035,760 B2* | 5/2015 | Reilhac | ................. | B60Q 9/004 |
| | | | | 180/271 |
| 9,064,408 B2* | 6/2015 | Komoguchi | ........... | G08G 1/167 |
| 9,123,248 B2* | 9/2015 | Takahashi | ................ | G08G 1/16 |
| 9,137,499 B2* | 9/2015 | Matsukawa | .............. | H04N 7/18 |
| 9,227,604 B2* | 1/2016 | Sugano | ................ | G01S 7/4816 |
| 9,415,774 B2* | 8/2016 | Sugano | ................ | B62D 15/027 |
| 9,454,906 B2* | 9/2016 | Muhlenberg | ......... | G01S 7/2813 |
| 9,493,114 B2* | 11/2016 | Takahashi | ............... | B60Q 7/005 |
| 9,613,533 B2* | 4/2017 | Iwami | .................... | G08G 1/168 |
| 9,630,556 B2* | 4/2017 | Max | ....................... | B60Q 9/006 |
| 2008/0211644 A1* | 9/2008 | Buckley | ............... | B62D 15/027 |
| | | | | 340/435 |
| 2010/0271237 A1* | 10/2010 | Reed | .................... | G01S 13/931 |
| | | | | 340/932.2 |
| 2010/0271238 A1* | 10/2010 | Reed | .................... | G01S 13/931 |
| | | | | 340/932.2 |
| 2012/0262284 A1 | 10/2012 | Irrgang et al. | | |
| 2014/0139368 A1 | 5/2014 | Takaki | | |
| 2015/0175063 A1* | 6/2015 | Takahashi | ............. | G08G 1/168 |
| | | | | 340/463 |

* cited by examiner

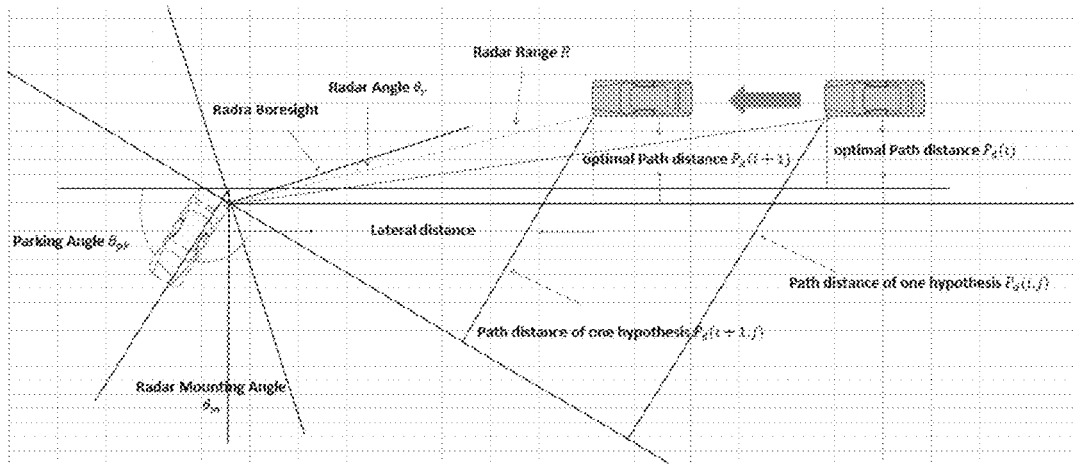

Figure 7

810
When new data $(R(i), \theta_r(i))$ is available, we run equation (1) for all parking angle hypothesis $\theta_{pk}(j)$ to obtain the path distance $P_d(i,j)$ 820
When $i \geq 2$, when start to do the parking angle estimation by calculate variance of $P_d(i,j)$ corresponding to all history of i for every j, in the other world, we have the variance of path distance vector $VarP_d(j)$ 830
Then we find the minimum of the vector $VarP_d(j)$ and the corresponding $\theta_{pk}(j)$ which is the best parking angle for the data up to current time i 840
Then we recalculate the path distance vector (up to current time i) using equation (1) and $\theta_{pk}(j)$ that we obtained from previous block. By doing average, we obtain the path distance estimation 850
Then we can run the alerting logic based on the path distance and OEM requirement. When there is a new data come in, we go back and run the whole thing again

Figure 8

DETECTION OF A TARGET OBJECT UTILIZING AUTOMOTIVE RADAR

BACKGROUND

1. Technical Field

The present disclosure is related to automotive radar systems and, in particular, to systems and methods utilizing automotive radar to detect a target object.

2. Discussion of Related Art

In automotive radar systems, multiple radar sensors can be mounted to a host vehicle. Each radar sensor includes a transmitter for transmitting radar signals into a region of interest adjacent to the vehicle and a receiver for receiving return radar signals from objects in the region of interest. Processing circuitry in each sensor processes the received return radar signals to detect various target objects (such as other vehicles) and determine range, bearing and/or velocity of the objects.

One example of a useful detection scenario involves cross-path detection (e.g., parking angle detection) as between the host vehicle and a target object. For example, in some embodiments, the host vehicle may represent a currently static vehicle (such as parked in a parking lot or stopped at an intersection) which is aiming pull forward or back up (such as to exit the a parking space or merge with a roadway). It is therefore useful in such a scenarios to detect target objects, such as other vehicles, which may cross paths with the host vehicle during such maneuvering. Advantageously, cross-path detection of a target object can be used to provide alerts or other feedback in order to prevent possible collisions. In some embodiments, feedback may be passive feedback, e.g., alerting the driver via a visual and/or audible warning of an impending collision. In other embodiments, feedback may be active feedback which may automatically regulate/control movement of host vehicle, e.g., via an automated driving system, automated braking system or the like.

Conventional cross-path detection of a target object via automotive radar has typically utilized a predetermined alert zone defined by one or more predetermined regions of interest relative to the host vehicle. Notably, these one or more regions of interest stay the same regardless of cross-path angle (the angle between the heading of the host vehicle and the trajectory of the target object). As disclosed herein, in some embodiments, overlapping regions of interest may be selected to represent an aggregate alert zone for several likely cross-path scenarios. For example, FIG. 1 depicts an example embodiment with utilizing an aggregate alert zone defined by two different regions of interest (region 1 and region 2). In this embodiment, region 2 is configured to represent a region of interest for an assumed 90 degree cross-path angle scenario and region 1 is configured to represent a region of interest for an assumed 45-60 degree cross-path angle scenario. The unfortunate result of utilizing a predetermined alert zone such as the aggregate alert zone depicted in FIG. 1, is that predetermined alert zones can typically be both over and under inclusive with respect to an otherwise optimal region of interest for a given cross-path angle scenario (see, e.g. the optimal region of interest for the 45 degree cross-path angle scenario in FIG. 1). Thus, a predetermined alert zone, such as an aggregate alert zone utilizing one or more predetermined regions of interest, can often result in inaccurate detection of a target object (such as providing a false indication of an impending collision or, worse yet, a delayed or inaccurate indication of an impending collision).

There is therefore a need for improved systems and methods for cross-path detection between a host vehicle and a target object. These and other needs are met by way of the present disclosure.

SUMMARY

Systems and methods are presented herein for improved cross-path detection between a host vehicle and a target object. In example embodiments a cross traffic alert system for a host vehicle, may include an automotive proximity sensing detector mountable to a host vehicle and configured for tracking a relative position of target object to the host vehicle over multiple time points (e.g., a radar transmitter for transmitting radar signals toward the target object; and a radar receiver for receiving a plurality of returning radar signals reflected from the target object while tracking of the target object over the multiple time points, the radar transmitter and the radar receiver being mountable in the host vehicle), where at any given time point, a trajectory of target object and a heading of the host vehicle intersect at a cross-path angle; and a processor configured for receiving and processing data from the automotive proximity sensing detector to determine a first estimate for the cross-path angle by solving a multiple hypothesis problem characterized by independent calculations across a first plurality of time points, the multiple hypothesis problem supposing a plurality of possible cross-path angle solutions, each cross-path angle solution representing a corresponding possible trajectory for the target object. The processor may then be further configured to determine whether a cross-traffic alert or other feedback should be triggered based at least partially on whether the target object is within a region of interest, wherein the region of interest is determined at least in part based on the estimated cross-path angle.

In some embodiments, the processor is further configured to determine a second estimate for the cross-path angle by solving a multiple hypothesis problem characterized by independent calculations across a second plurality of time points. Thus, cross-path angle may be estimated across a plurality of tracks, as described herein.

In some embodiments the first estimate for the cross-path angle may be determined by selecting a cross-path angle solution from the plurality of possible cross-path angle solutions which minimizes a variance between results of the independent calculations across the first plurality of time points. For example, the cross-path angle may be estimated by: (i) for each of the first plurality of time points calculating for each of the plurality of possible cross-path angle solutions a corresponding perpendicular path distance between the corresponding possible trajectory for the target object at that time point and a reference position for the host vehicle, and (ii) determining the first estimate for the cross-path angle based on selecting a cross-path angle solution from the plurality of possible cross path-angle solutions which minimizes a variance between the corresponding perpendicular path distances for each of the time points. Note that the shortest path distance may then be determined as an average of the corresponding perpendicular path distances for the first estimate of the cross-path angle across the first plurality of time points.

Advantageously, as noted herein, in some embodiments, solving the multiple hypothesis problem may include: (i) for each of the first plurality of time points calculating for each of the plurality of possible cross-path angle solutions a corresponding perpendicular path distance between the corresponding possible trajectory for the target object at that time point and a reference position for the host vehicle, and (ii) for each of the plurality of possible cross-path angle solutions, determining a variance between the corresponding perpendicular path distances for each of the time points. Thus, for example, wherein the first plurality of time points includes a first time point and a second time point, solving the multiple hypothesis problem may include (i) for the first time point, calculating for each of the plurality of possible cross-path angle solutions a corresponding perpendicular path distance between the corresponding possible trajectory for the target object at the first time point and the reference position for the host vehicle (ii) for the second time point, calculating for each of the plurality of possible cross-path solutions a corresponding perpendicular path distance between the corresponding possible trajectory for the target object at the second time point and the reference position for the host vehicle and (iii) for each of the plurality of possible cross-path angle solutions, determining a difference between the corresponding perpendicular path distance at the first time point and the corresponding perpendicular path distance at the second time point. Advantageously, to conserve memory, the perpendicular path distances first plurality of time points may be calculated after data for each of the first plurality of time points is received. Thus, variance information for the first plurality of time points may be stored in a buffer after which the underlying perpendicular path distance data may be discarded from memory.

Note that the embodiments described herein may apply with respect to situations both where the host vehicle is stationary and where the host vehicle is in motion. Thus, in some embodiments, and the reference point for the host vehicle used in the calculations described herein may be a common point of reference with known offsets relative to a position of the host vehicle at each of the time points.

In further example embodiments, a traffic alert system for a host vehicle is disclosed including: an automotive proximity sensing detector mountable to a host vehicle and configured for tracking a relative position of target object to the host vehicle over multiple time points (e.g., a radar transmitter for transmitting radar signals toward the target object; and a radar receiver for receiving a plurality of returning radar signals reflected from the target object while tracking of the target object over the multiple time points, the radar transmitter and the radar receiver being mountable in the host vehicle), where at any given time point, a trajectory of target object and a heading of the host vehicle intersect at a cross-path angle; and a processor for receiving and processing data from the automotive proximity sensing detector to determine an estimate for the cross-path angle for each of a plurality of trackings of the target object, wherein each tracking is characterized by a different set of two or more time points. In some embodiments, the processor may be further configured to determine variance between cross-path angle estimates. Thus, for example, the processor may be further configured to determine an average cross-path angle by identifying and averaging cross-path angle estimates with low variance relative to one another (note that in general, an average cross-path angle may be determined by averaging a plurality of cross-path angle estimates). In some embodiments, the processor may be further configured to determine a change in trajectory of the target object based on variance between cross-path angle estimates. Thus, for example, the processor may be configured (i) to determine that there has been a substantial change of direction of the target object indicative of a turn if the variance between cross-path angle estimates exceeds a first threshold and/or (ii) to determine that there has been a small change in direction of the target object indicative of a curve if the variance between cross-path angel estimates is less than the first threshold and exceeds a second threshold. Notably, if a turn is detected, cross-path angle estimations from trackings before the substantial change of direction may be ignored when determining an average cross-path angle. Moreover, if a curve is detected, one or more of (i) a data sampling rate is increased so as to reduce time cross-path angle estimates or (ii) a buffering size is decreased so as to use fewer cross-path angle estimates when determining an average.

In further example embodiments, a cross traffic alert system for a host vehicle is disclosed including: an automotive proximity sensing detector mountable to a host vehicle and configured for tracking a relative position of target object to the host vehicle over multiple time points (e.g., a radar transmitter for transmitting radar signals toward the target object; a radar receiver for receiving a plurality of returning radar signals reflected from the target object while tracking of the target object over the multiple time points, the radar transmitter and the radar receiver being mountable in the host vehicle), where at any given time point, a trajectory of target object and a heading of the host vehicle intersect at a cross-path angle; and a processor configured for receiving and processing data from the automotive proximity sensing detector to determine an estimate for the cross-path angle and to determine a shortest path distance between a position of the host vehicle and a trajectory of the target object as determined by the estimate for the cross-path angle. Note that the shortest path distance may be determined as a projection of a distance between a position of the host vehicle and a position of the target object along an axis perpendicular to a trajectory of the target object as characterized by the estimate of the cross-path angle, wherein the distance between the position of the host vehicle and the position of target object is determined based on a range measurement. Advantageously, the processor may be configured to determine whether a cross-traffic alert or other feedback should be triggered based at least partially on the determined shortest path distance (e.g., based on the determined shortest path distance exceeding a threshold which may either be a fixed threshold or a variable threshold based on the estimated cross-path angle).

In further example embodiments, a cross traffic alert system for a host vehicle is disclosed including: an automotive proximity sensing detector mountable to a host vehicle and configured for tracking a relative position of target object to the host vehicle over multiple time points (e.g., a radar transmitter for transmitting radar signals toward the target object; a radar receiver for receiving a plurality of returning radar signals reflected from the target object while tracking of the target object over the multiple time points, the radar transmitter and the radar receiver being mountable in the host vehicle), where at any given time point, a trajectory of target object and a heading of the host vehicle intersect at a cross-path angle; and a processor configured for receiving and processing data from the automotive proximity sensing detector to determine an estimate for the cross-path angle and to determine a lateral distance characterized by the perpendicular distance between a vector perpendicular to a trajectory of the target object, as determined by the estimate for the cross-path angle, and a position of host vehicle. Note that the lateral distance may be determined as a projection of a distance between a position of the host vehicle and a position of the target object along an axis parallel to a current trajectory of the target object, wherein the distance between the position of the host vehicle and the position of target object is determined based on a range measurement. The processor may further be configured to determine a time to collision (TTC) for the target object based on the lateral distance and a velocity for the target object in a lateral distance direction. Advantageously, the processor may be configured to determine whether a cross-traffic alert or other feedback should be triggered based at least partially on the determined TTC for the target object.

BRIEF DESCRIPTION OF THE DRAWINGS

FIGS. 6 and 7 depict example tracks of a target object moving relative to a host vehicle for different cross-path angle scenarios.

FIG. 8 depicts a flow chart of an exemplary algorithm for estimating cross-path angle, according to the present disclosure.

Figure 1:
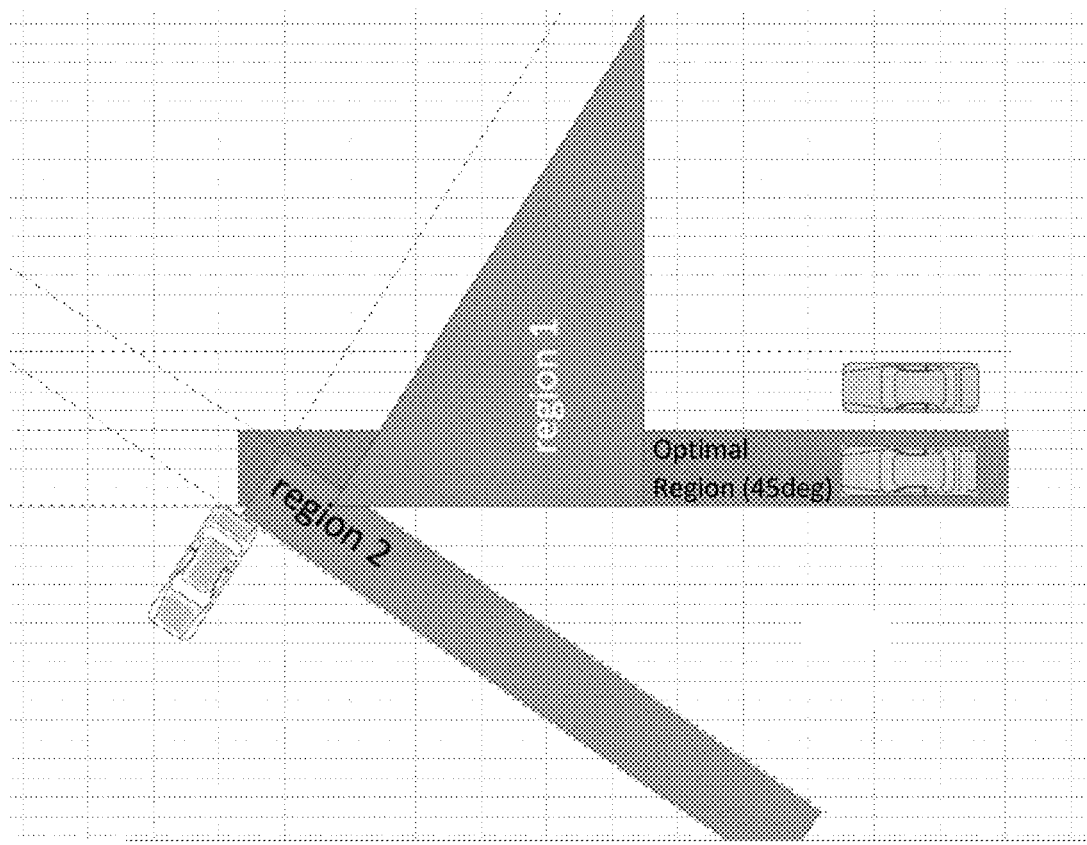
FIG. 1 depicts an example predetermined aggregate alert zone, according to the present disclosure.

The present disclosure is further described in the detailed description which follows, in reference to the noted plurality of drawings by way of non-limiting examples of embodiments of the present disclosure, in which like reference numerals represent similar parts throughout the several views of the drawings

DETAILED DESCRIPTION

According to the exemplary embodiments of the present disclosure, provided are systems and methods for improved cross-path detection between a host vehicle and a target object utilizing an automotive radar system. Generally speaking, the systems and methods of the present disclosure, utilize automotive radar on a host vehicle to track changes in a position of a target object and, based on such tracked changes in position, determine a cross-path angle as between a path of the host vehicle and a path of the target object. This cross-path angle can advantageously characterize an optimal region of interest for cross-path detection based on the current trajectory of the target object and host vehicle. Applicant notes that while various example embodiments herein relate to the use of "radar" and "radar systems," the subject application is not limited to such radio wave based sensing. Rather, the systems and methods described herein may utilize any automotive proximity sensing detector that is able to provide range and angular position information for a target object, such as laser scanning (e.g., Lidar) based systems, cameras or other image based sensing systems, and the like.

Advantageously, the cross-path angle may be determined iteratively/recursively (e.g., over three or more points in time representing at least a plurality of independent tracks). Iterative/recursive determination of the cross-path angle may advantageously enable detection of and account for a change in trajectory, such as curved path, of the target object and/or of the host vehicle (which may be characterized by a change in the cross-path angle). Thus, e.g., in some embodiments a sampling frequency for tracking changes in position of the target object can be actively adjusted, e.g., based on changes in the cross-angle. For example, in some embodiments, it may be advantageous to increase the sample frequency and/or reduce a buffer size when a change is detected in the cross-path angle, such as a change indicating a curved path trajectory of the target object and/or of the host vehicle.

Iterative/recursive determination of the cross-path angle may also enable adaptive windowing of a plurality of cross-path angle data points in a data set based on iterative/recursive changes in the cross-path angle. In this way, outlier data points may be discounted/discarded from the data set resulting in more reliable data than single track calculation of cross-path angle. In some embodiments, changes in the cross-path angle can be used to detect/determine a change of direction of the target object. Thus, for example, the adaptive windowing may be configured to utilize only data points from after the change in direction.

In preferred embodiments, cross-path detection may assume a fixed or static host vehicle, e.g., such as a vehicle that is preparing to back out of a parking space or drive way or waiting at an intersection. Assuming a fixed or static host vehicle may advantageously simplify calculation of a cross-path angle between the host vehicle trajectory and the target object trajectory.

In some embodiments the cross-path angle may be determined for first track of a target object (e.g., as characterized by the tracking the target object over a first set of two or more timepoints). Thus, in some embodiments, the cross-path angle may be determined by by solving a multiple hypothesis problem which supposes a range of possible solutions for the cross-path angle, wherein each possible solution characterizes an angular offset of a possible corresponding solution vector for a trajectory of the target object relative to a heading of host vehicle. In such embodiments, solving the multiple hypothesis problem may include for each of a plurality of time points in the first track, calculating for each possible cross-path angle solution a corresponding perpendicular path distance between the corresponding solution vector and the target object. The multiple hypothesis problem may then be solved for the cross-path angle solution which best minimizes a variance between the corresponding perpendicular path distances for each of the time points. Applicant notes that the term "variance" as used herein is not limited to the mathematical determination of variance which is the expectation of the deviation of a parameter value from its mean. Rather, "variance" is generally used to refer to some measure reflective of a degree to which a parameter value diverges relative to a distribution of parameter values or some other quality assessment measure with respect to a distribution of parameter values. Thus, in some embodiments, variance may include, mathematical variance calculations, standard deviation calculations, average of absolute value calculations, or the like.

Advantageously, the use of a multiply hypothesis type problem may facilitate an approach where independent calculations across multiple time points each suppose a plurality of possible solutions and where cross-path angle is estimated based on a convergence of these possible solutions across multiple time points. For example, in some embodiments, a multiple hypothesis problem may be posed which supposes a range of possible solutions for the cross-path angle, each possible cross-path angle solution representing a corresponding possible trajectory for the target object at a given time point. Thus, solving the multiple hypothesis problem may include: (i) for each of a first plurality of time points calculating for each of the plurality of possible cross-path angle solutions a corresponding perpendicular path distance between the corresponding possible trajectory for the target object at that time point and a reference position for the host vehicle, and (ii) for each of the plurality of possible cross-path angle solutions, determining a variance between the corresponding perpendicular path distances for each of the time points. Thus, for example, where the first plurality of time points includes a first time point and a second time point, solving the multiple hypothesis problem may include (i) for the first time point, calculating for each of the plurality of possible cross-path angle solutions a corresponding perpendicular path distance between the corresponding possible trajectory for the target object at the first time point and the reference position for the host vehicle (ii) for the second time point, calculating for each of the plurality of possible cross-path solutions a corresponding perpendicular path distance between the corresponding possible trajectory for the target object at the second time point and the reference position for the host vehicle and (iii) for each of the plurality of possible cross-path angle solutions, determining a difference between the corresponding perpendicular path distance at the first time point and the corresponding perpendicular path distance at the second time point. Note that, in some embodiments, the multiple hypothesis problem may be solved across more than two time points. For example, in some embodiments, the solving the multiple hypothesis problem may further include for a third time point, calculating for each of the possible solutions for the cross-path angle a corresponding perpendicular path distance between the corresponding possible trajectory for the target object at the third time point and a reference position for the host vehicle. Thus, in some embodiments, estimating the cross-path angle may be based on which possible cross path angle solution results in the lowest variance between the corresponding perpendicular path distances for each of three time points.

Alternatively, in some embodiments, separate cross-path angle estimates may be calculated for each of a plurality of tracks. Thus, in some embodiments, the systems and methods may further determine a variance between cross-path angle estimations for a plurality of tracks and, where the variance is below a given threshold, calculate an average estimated cross-path angle (averaging those cross-path angle estimations which fall in an acceptable variance range).

Notably, in some embodiments the perpendicular distance between the corresponding solution vector and the target object may be a shortest path distance between a current position of the host vehicle and a current trajectory of the target object. It is noted that this shortest path distance may also be characterized as a projection of the distance between the host vehicle and the target object along an axis perpendicular to a current trajectory of the target object. Thus, in some embodiments, shortest path distance may, e.g. be characterized as a perpendicular distance between the path of the target object and a current position of host vehicle. Advantageously, as described herein, shortest path distance may be a useful metric for bounding a region of interest, e.g., thereby establishing an alert zone for the host vehicle. In particular, systems and methods may be configured to trigger an alert or other feedback only where the host vehicle is within a predetermined shortest path distance to the target object. Notably, in some embodiments, shortest path distance may be calculated based on a solved cross-path angle. It is also noted that, in some embodiments, shortest path distance may also be characterized as the convergence of the perpendicular distance between the corresponding solution vector and the target object for the first point in time substantially equaling the perpendicular distance between the corresponding solution vector and the target object for the second point in time.

It is noted that, for a given position of the host vehicle, shortest path distance is configured to remain constant regardless of a current orientation of the host vehicle (with only the relative orientation and not the magnitude of the shortest path distance vector changing). In this way shortest path distance may be used to represent apply a fixed buffer distance for a region of interest characterizing an alert zone regardless of orientation of the host vehicle (for example by applying a fixed threshold with respect to shortest path distance). Thus, in some embodiments, a buffer width of the alert zone may remain constant with only an orientation of the alert zone changing relative to the host vehicle as determined based on the cross-path angle. In other embodiments, it may be useful to apply a varying buffer distance depending on host vehicle orientation. For example, in some embodiments, a variable threshold may be applied with respect to shortest path distance, e.g., based on the cross-path angle. Thus, angles of 60 degrees and 45 degrees may be configured to have a different threshold than angles of 90 degrees, such as a greater threshold or smaller threshold depending on the embodiment.

In some embodiments, another useful metric which can be utilizes is true path distance. True path distance may refer to the distance, along a heading of the host vehicle, between a current position of the host vehicle and a current trajectory of the target object. It is noted that, for a given position of the host vehicle, the true path distance varies depending on a current orientation of the host vehicle (with only the relative orientation and not the magnitude of the shortest path distance vector changing). In this way true path distance may be used to establish a variable buffer distance for a region of interest characterizing an alert zone which is dependent on the orientation of the host vehicle. Thus, in some embodiments, a buffer width of the alert zone may be configured to vary with the cross-path angle. In example embodiments this variable buffer width may be determined based on a threshold applied to a true path distance vector extending along a heading of the host vehicle between a current position of the host vehicle and a current trajectory of the target object (e.g., where the a threshold is applied to the magnitude of the vector). Thus, the buffer width may be calculated as the projection of the thresholded vector along an axis perpendicular to a current trajectory of the target object. Note that, in this way the variable buffer width may be configured to be greater where the cross-path angle is closer to 90 degrees.

It is notable that in some embodiments true path distance may be used in conjunction with shortest path distance to establish an aggregate buffer width. For example, in some embodiments the buffer width may be established based on an aggregate of the buffer width for the shortest path distance aggregated with the buffer width calculated for the true path distance. Thus, in some embodiments, a threshold that may be applied to shortest path distance may be a variable threshold equal to a fixed threshold value plus the projection of the thresholded true path distance vector along an axis perpendicular to a current trajectory of the target object.

A further useful metric which is described herein is lateral distance which as used herein may generally refer to a perpendicular distance between a vector perpendicular to a current trajectory of the target object at a current position of the target object and a point along the heading of the host vehicle. In some embodiments, the point along the heading of the host vehicle may be a current position of the host vehicle, in which case lateral distance may be calculated as a projection of the distance between the host vehicle and the target object along an axis parallel to a current trajectory of the target object. In alternative embodiments, the point along the heading of the host vehicle may be a point of intersection between the heading of the host vehicle and a current trajectory of the target object. Thus, in such lateral distance may represent the distance between a current position of the target object and the heading of the host vehicle along a current trajectory of the target object.

Advantageously, as described herein, lateral distance may be a useful metric for estimating a time to collision (TTC) for the target object, e.g., based on the lateral distance and a current speed of the target object. Thus, lateral distance and/or TTC of the target object may further be used in the bounding of region of interest, e.g., thereby establishing an alert zone for the host vehicle. In particular, systems and methods may be configured to trigger an alert or other feedback only where the target object is within a predetermined lateral distance and/or TTC from the host vehicle.

Note that in further embodiments a TTC may further be determined for the host vehicle intersecting the trajectory path of the target object, e.g. based on the true path distance and a current speed of the host vehicle. In some embodiments TTC for the host vehicle may be utilized be an additional bounding factor for a region of interest.

Thus, in some embodiments systems and methods may be configured to trigger an alert or other feedback only where any combination of one or more of the following criteria are met: (i) the host vehicle is within a predetermined shortest path distance to the target object, (ii) the host vehicle is within a predetermined lateral distance to the target object, (iii) the TTC of the target object is less than a given threshold, and/or (iv) the TTC of the host vehicle is less than a given threshold. For example, in preferred embodiments an alert or feedback may be triggered when (i) the host vehicle is within a predetermined shortest path distance to the target object or the TTC of the host vehicle is less than a given threshold and (ii) the TTC of the target object is less than a predetermined threshold. In some embodiments, the criteria may provide for both situations which trigger and situation which prevent triggering of an alert of feedback. Thus, for example, in some embodiments, the criteria may include, with respect to shortest path distance, a first threshold for triggering an alert or feedback and a second threshold for preventing an alert or feedback from triggering. Notably, this allows for an intermediary range of values for shortest path distance which do not in themselves automatically trigger an alert or feedback but rather permit an alert or feedback to be triggered based on other criteria.

While, example embodiments and calculations herein generally relate to a static host vehicle (in the interested of simplicity) it is noted that the present disclosure is not limited to such embodiments. Thus, in some embodiments, cross-path detection may further account for a moving host vehicle. In such embodiments, a position and orientation of the host vehicle at the second point in time may be known relative to the position and orientation of the host vehicle at the first point in time (e.g., based of GPS or other motion tracking of the host vehicle such as gyro or steering wheel angle, speedometer/odometer readings, etc.). This known relative position data may advantageously be used to offset the radar calculations at one or more of the points in time, e.g., so as to provide a common point of reference for the radar inputs (notably the common point of reference may be the host vehicle position and orientation at a first time point, the vehicle position and orientation at a second time point of some other common reference point for vehicle position and orientation). Thus, calculation of a cross-path angle may proceed based on the common point of reference using similar calculations described herein (essentially the use of the common reference point for host vehicle position and orientation reduces the calculation of the cross-path angle to one where the host vehicle is static). In this way the cross-path angle for the host vehicle may be calculated for the vehicle at the common point of reference, e.g., a cross-path angle may be determined relative to the host vehicle position and orientation at a first time point or at the second time point. Note that in some embodiments, a cross-path angle solution for a reference point may be transposed so as to represent a cross-path angle solution for the host vehicle position and orientation at a desired time point (such a transposition may be implemented based on the offset relative to the common point of reference). Thus generally speaking, in the case of a dynamic host radar measurements may be compensated each time the host vehicle moves in orientation and/or position, e.g., as characterized by host yaw rate and speed information.

Figure 2:
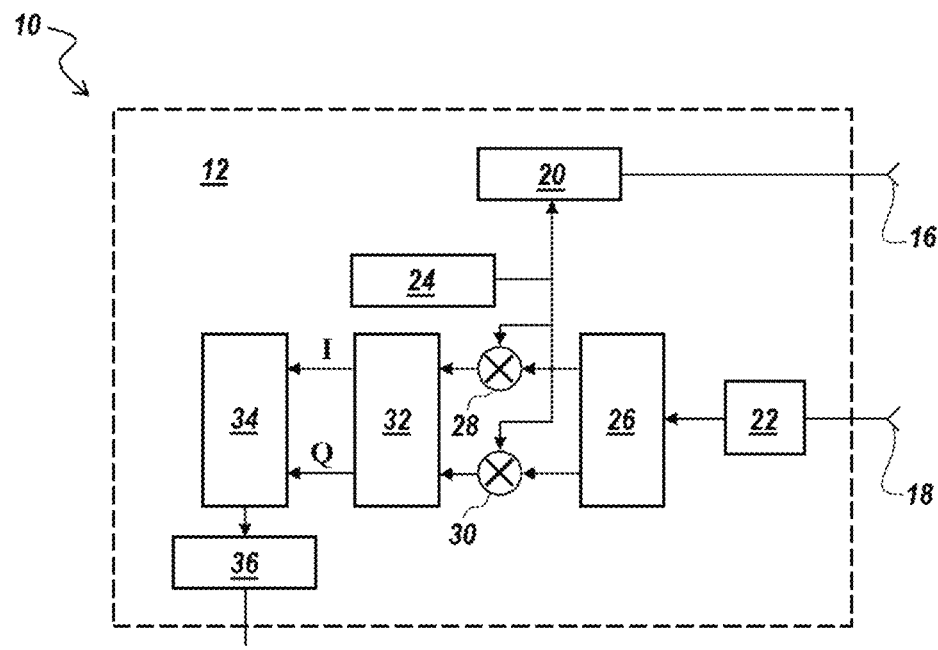
FIG. 2 depicts a schematic block diagram of an example automotive radar system, according to the present disclosure.

As noted above, the systems and methods described herein utilize an automotive radar system of a host vehicle for cross-path detection of a target object. FIG. 2 includes a schematic block diagram of an automotive radar system 10, including one or more radar sensor modules 12 for processing automotive radar signals, in accordance with some exemplary embodiments. Referring to FIG. 2, radar system 10 includes one or more radar modules 12, which process radar transmit and receive signals which are compatible with radar system 10 in the host vehicle. Radar sensor module 12 generates and transmits radar signals into the region of interest adjacent to the host vehicle that is being monitored by the radar system. Generation and transmission of signals is accomplished by RF signal generator 24, radar transmit circuitry 20 and transmit antenna 16. Radar transmit circuitry 20 generally includes any circuitry required to generate the signals transmitted via transmit antenna 16, such as signal shaping/timing circuitry, transmit trigger circuitry, RF switch circuitry, RF power amplifier circuitry, or any other appropriate transmit circuitry used by radar system 10 to generate the transmitted radar signal according to exemplary embodiments described in detail herein. In some embodiments, the RF signal transmit circuitry 20 may include an RF switch mechanism may rely on inputs from an RF oscillator included in RF signal generator 24. The RF signal transmit circuitry may further advantageously include pulse shaping circuitry, e.g., based on transmit antenna trigonometric calculations.

Radar module 12 also receives returning radar signals at radar receive circuitry 22 via receive antenna 18. Radar receive circuitry 22 generally includes any circuitry required to process the signals received via receive antenna 18, such as RF low noise amplifier circuitry, signal shaping/timing circuitry, receive trigger circuitry, RF switch circuitry, or any other appropriate receive circuitry used by radar system 10. In some embodiments, radar receive circuitry 22 may also include a receiver antenna select module for selecting the receive antenna from a plurality of receive antennas. In some exemplary embodiments, the received signals processed by radar receive circuitry 22 are forwarded to phase shifter circuitry 26, which generates two signals having a predetermined phase difference. These two signals, referred to as an inphase (I) signal and a quadrature (Q) signal, are mixed with an RF signal from RF signal generator 24 by mixers 28 and 30, respectively, to generate I and Q intermediate frequency (IF) signals. In some embodiments mixing may further be based on pulse shaping of the RF signal from the RF signal generator 24 based on receive antenna trigonometric calculations. The resulting IF signals are further filtered as required by filtering circuitry 32 to generate filtered IF I and Q signals, labeled "I" and "Q" in FIG. 2. The IF I and Q signals are digitized by analog-to-digital converter circuitry (ADC) 34. These digitized I and Q IF signals are processed by a processor, such as a digital signal processor (DSP) 36. In some exemplary embodiments, the DSP 36 can perform all of the processing required to carry out the object detection and parameter determination, including object range, bearing and/or velocity determinations, performed by system 10.

It will be understood that the system configuration illustrated in FIG. 2 is exemplary only and that other system configurations can be used to implement the embodiments described herein. For example, the ordering of filtering of the IF signal and analog-to-digital conversion may be different than the order illustrated in FIG. 2. The IF signal may be digitized before filtering, and then digital filtering may be carried out on the digitized signal(s). In other embodiments, the entire IF stage may be removed so that the RF signal is directly converted to DC for further digitizing and processing.

According to the present disclosure, the systems and methods provided herein may advantageously provide cross-path detection as between a host vehicle and a target object. As noted above, in some embodiments, the host vehicle may represent a vehicle (e.g., parked in a parking lot or stopped at an intersection) which is aiming pull forward or back up (e.g., such as to exit the a parking space or merge with a roadway). It is therefore useful in such a scenarios to detect target objects, such as other vehicles, which may cross paths with the host vehicle during such maneuvering. Advantageously, cross-path detection of a target object can be used to provide alerts or other feedback in order to prevent possible collisions. In some embodiments, feedback may be passive feedback, e.g., alerting the driver via a visual and/or audible warning of an impending collision. In other embodiments, feedback may be active feedback which may automatically regulate/control movement of host vehicle, e.g., via an automated driving system, automated braking system or the like.

Figure 3:
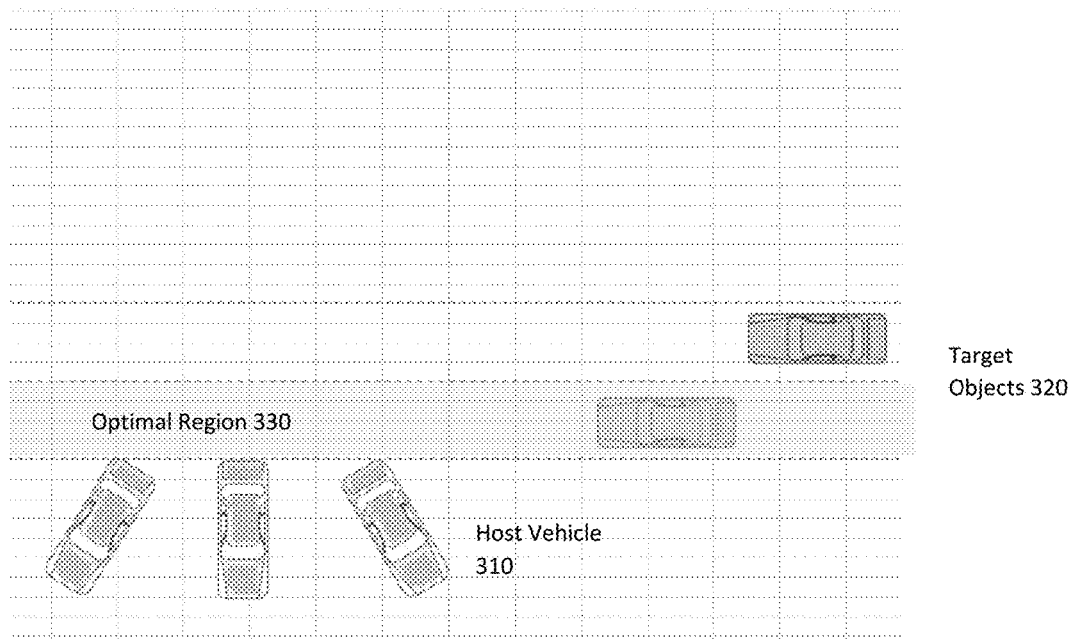
FIG. 3 depicts how an optimal region of interest for an alert zone may change (relative to a host vehicle) depending of the cross-path angle between the host vehicle and a target object, according to the present disclosure.

In contrast with conventional cross-path detection systems which utilize a predetermined and static zone alert zone (e.g., as characterized by one or more overlapping regions of interest), the systems and methods of the subject application allow enable the alert zone to change as a function of the cross-path angle. FIG. 3 illustrates how an optimal region of interest may change (relative to the host vehicle) depending on the orientation of the host vehicle. In particular, FIG. 3 depicts three example orientations of the host vehicle. Notably, the optimal region of interest, in each case, remains aligned with the trajectory of the target objects rather than with the host vehicle.

Figure 4:
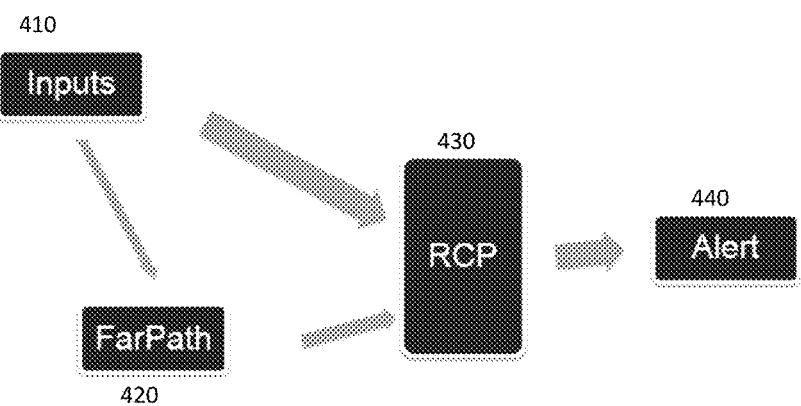
FIG. 4 depicts a flow diagram for an exemplary cross-path alert system, according to the present disclosure.

With reference now to FIG. 4, a flow diagram for an exemplary cross-path alert system is depicted. At step 410, inputs, such as received radar information for a track of a target object by a host vehicle, are received by the system. These inputs are next processed at step 420 to estimate cross-path angle, e.g., via solving a multiple hypothesis problem such as described herein. In some embodiments, step 420 may further include utilizing the cross-path angle to estimate a shortest path distance of the host vehicle to the target object (as characterized by the perpendicular distance between the host vehicle and a current trajectory of a target object). Advantageously, this path distance may be used in establishing a region of interest, which may be limited to a particular threshold path distance. Thus, for example, an alert zone may be bounded to being less than a predetermined shortest path distance from the host vehicle. In further embodiments, step 420 may also include utilizing the cross-path angle to determine a lateral distance of the host vehicle to the target object (e.g., as may, in some embodiments, be characterized by the perpendicular distance between a vector perpendicular to a current trajectory of the target object and a current position of the host vehicle). In yet further embodiments, step 420 may include TTC calculations for the target object, e.g., based on the lateral distance and a current speed of the target object. Notably, in some embodiments step 420 may also include other further calculations such as relating to true path distance and TTC for the host vehicle, as described herein. Advantageously, in some embodiments the calculations of step 420 may be implemented utilizing via a single processing module (e.g. FarPath module of FIG. 4). These calculations may serve as an input into cross-path feedback module (e.g., RCP module of FIG. 4) which may at step 430 evaluate such parameters to determine a possible alert or other feedback. For example, in some embodiments the cross-path feedback module may be a pre-existing alert module configured to generate an alert or other feedback when the target is in an alert zone, where the parameters establishing the alert zone are given by the calculations of the processing module. Finally, at step 440 an alert or feedback is generated from the cross-path feedback module. As noted above, feedback may be passive such as an auditory or visual warning to the driver or active such activating an automatic breaking feature.

Figure 5:
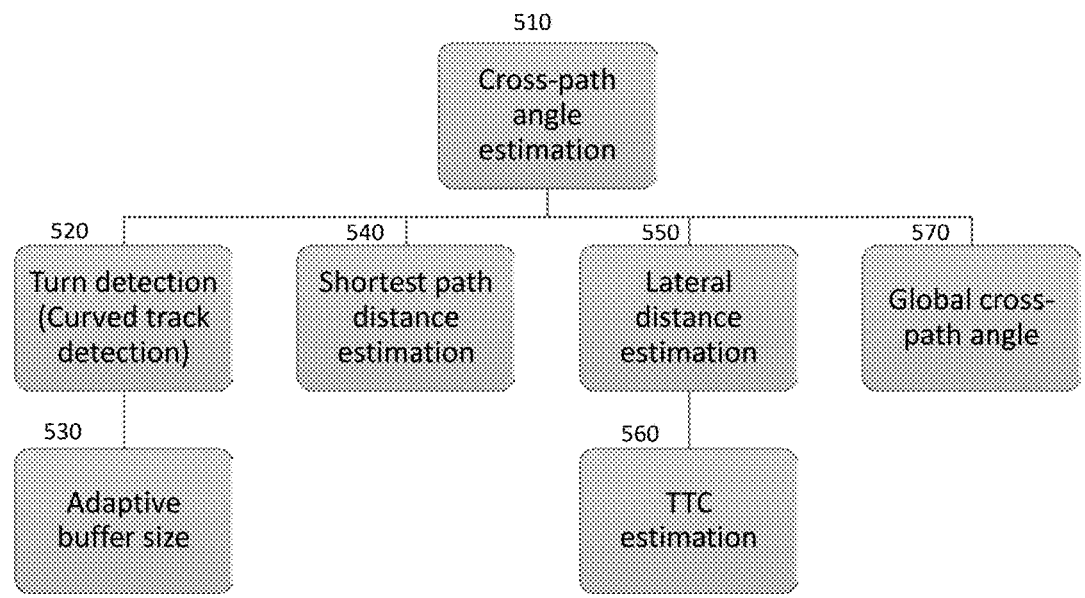
FIG. 5 depicts a flow diagram for an exemplary processing module for the cross-path alert system of FIG. 5, according to the present disclosure.
Figure 6:
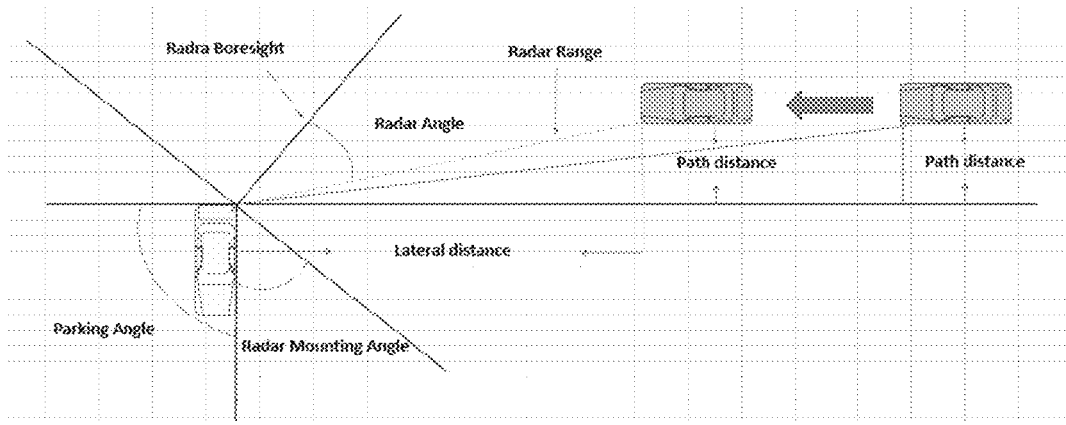

With reference now to FIG. 5, a flow diagram for an exemplary processing module is depicted. At step 510 a cross-path angle is estimated for a given track. FIGS. 6 and 7 each illustrate example tracks of a target object moving relative to a host vehicle. FIG. 6 represents an example where the cross-path angle is 90 degrees and FIG. 7 represents an example where the cross-path angle is 60 degrees. FIGS. 6 and 7 further illustrate various input parameters which may be used in the estimation of the cross-path angle at step 510 of FIG. 4. For example, these radar input parameters which may include a radar range calculation R (which may be the distance between the host vehicle and the target vehicle at a given time point) and a radar angle $\theta_r$ (which may be the angle of the target vehicle relative to the radar boresight at a given time point). The radar angle $\theta$, may further be positionally associated relative to the host vehicle via one or more additional parameters such as the radar mounting angle $\theta_m$ (which may be the angle between an axis perpendicular to the radar boresight and a drive path of the host vehicle). In the embodiments of FIGS. 6 and 7 the cross-path angle is also referred to as the parking angle $\theta_{pk}$ (given that the examples of FIGS. 6 and 7 assume a stationary host vehicle). In order to facilitate calculating the parking angle $\theta_{pk}$ a path distance $P_d(i,j)$ is calculated for each time point and each possible parking angle $\theta_{pk}(j)$ using the equation $P_d(i,j) = -R(i) * \cos(\theta_{pk}(j) + \theta_m - \theta_r(i))$ (also referred herein as equation (1)), where i is the time instant and j is the hypothesis iteration/recursion. Thus a multiple hypothesis problem is posed where $\theta_{pk}$ may be solved by minimizing the variance of the vector $P_d$ between time points (under the assumption that the target moves in a straight line): $\theta_{pk}$=argmin(var($P_d$)). This method minimized computational complexity utilizing a cost function that is essentially convex in nature.

Referring again to FIG. 5 at step 540 the cross-path angle estimate can be utilized to determine shortest path distance. As will be appreciated herein since multiple hypothesis method already poses a parameter for path distance $P_d(i,j)$ which for the solved parking ankle $\theta_{pk}(j)$ is the shortest path distance, step 540 may actually be carried out somewhat in conjunction with step 550. Thus, e.g. FIG. 8 depicts a flow chart of an exemplary algorithm for calculating parking angle $\theta_{pk}$ and determining the shortest path distance. At step 810, when new data (R(i), $\theta_r(i)$) is available, equation (1) is run for all parking angle hypothesis $\theta_{pk}(j)$ to obtain the path distance $P_d(i, D$. At step 820, when i≥2, (more than two time points) the variance of $P_d(i, j)$ is calculated corresponding to all history of i for every j, thus yielding the variance of path distance vector Var$P_d(j)$. Next at step 830 the minimum of the vector Var$P_d(j)$ is determined and the corresponding $\theta_{pk}(j)$ which is the best parking angle for the data up to current time i. At step 840 the path distance vector is recalculated (up to current time i) using equation (1) and $\theta_{pk}(j)$ that was solved for at step 830. This path distance vector represents the shortest path distance for the host vehicle and can be used as a parameter for an alert zone. Notably path distance estimation per the example algorithm utilizing a weighted average of parking angle estimate convergence. Thus, finally at step 850 alerting logic based on the shortest path distance and OEM requirement is implemented.

Figure 9:
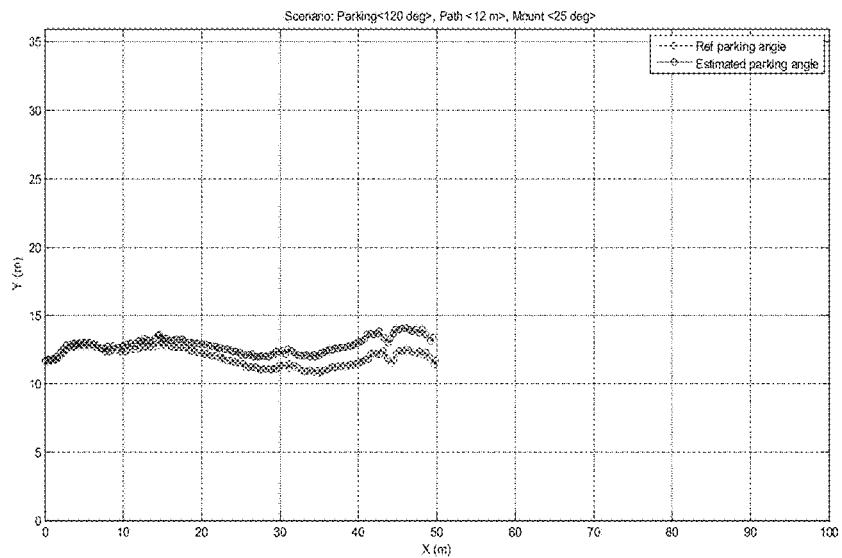
FIGS. 9 and 10 depict empirical results demonstrating the effectiveness of the algorithm of FIG. 8.
Figure 10:
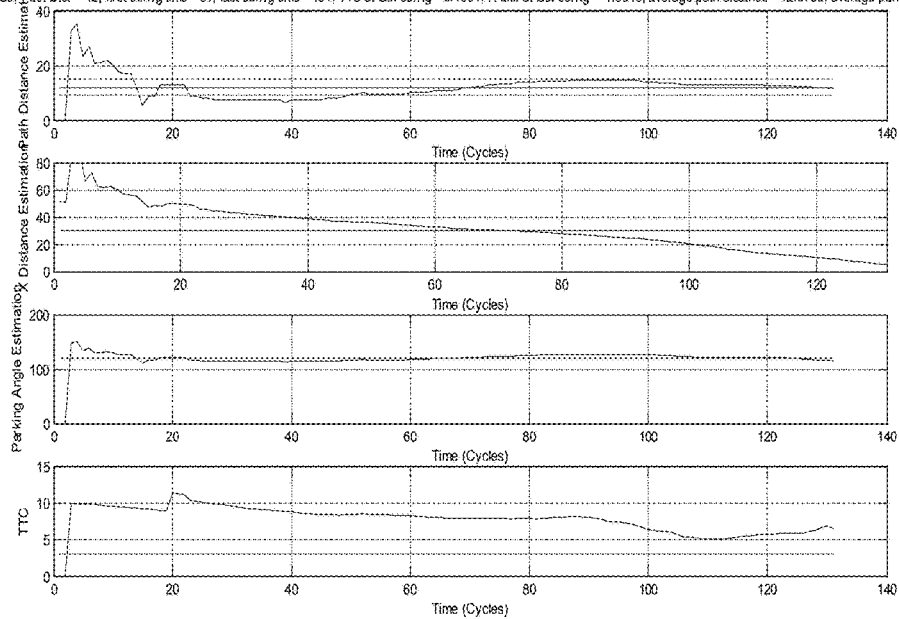

With reference to FIGS. 9 and 10 the effectiveness of the algorithm of FIG. 8 is demonstrated. In particular, FIG. 9 demonstrates the relative effectiveness of the algorithm of FIG. 8 in estimating parking angle for different relative positions. In FIG. 9 X(m) is the lateral distance and Y(m) is the shortest path distance. FIG. 10 then demonstrates the convergence time for solving the multiple hypothesis problems of the estimation of the various parameters including from top to bottom (i) shortest path distance, (ii) lateral distance, (iii) parking angle, and (iv) TTC.

Notably, the algorithm of FIG. 8 may be advantageously run iteratively/recursively for each new track provided by each new time point (i, i+1, i+2, i+3, etc.). This iterative/recursive approach may advantageously enable data smoothing as well as identifying outlier data points which may be discounted/discarded from the data set. For example, in some embodiments, one or more of the calculated parameters such as cross-path angle, shortest path distance and the like may be verified by subsequent calculations, e.g., wherein a threshold number of conforming calculations are required to validate such data points. In further embodiments, calculated parameters such as cross-path angle, shortest path distance and the like determined based on an average of results from multiple tracks. In some embodiments, nonconforming calculation may be discounted/discarded, e.g., as outliers. In general, the interactive calculation of parameters across multiple tracks provides for greater data reliability and integrity than is achievable using data from a single track.

Referring again to FIG. 5, the cross-path angle (e.g., calculated parking angle $\theta_{pk}$ (j)) may also be used to calculate a lateral path distance (at step 550) which may be calculated as the projection of the distance between the host vehicle and the target object into an axis parallel with the trajectory of the target object. In turn, the lateral path distance may then be used to calculate a TTC for the target object (at step 560), for example, based on the lateral distance and the velocity of the target object. As described herein, alerting logic based on these parameters may be also be implemented.

Advantageously, in some systems and methods the processing module may further include processing (at step 520) for detecting changes in a trajectory of the target object, for example, turn detection and/or a curved track detection. Advantageously, such detection of a change in trajectory of the target object is enabled by the iterative/recursive determination of cross-path angle across multiple tracks. In particular, changes in direction of the target object may be detected based on changes in the cross-path angle from one track to a subsequent track. Notably, in embodiments where the host vehicle is static the changes in the cross-path angle may be fully attributed to changes in direction by the target object. However, in other embodiments where the host vehicle may also experience a change in orientation between tracks it may be necessary to first normalize the cross-path angle for each track to a common point of reference before comparing changes in the normalized cross-path angle.

In either case, in some embodiments, a threshold may be applied to detect a large change in direction, e.g., which can be attributed to the target object turning. Thus, for example, in some embodiments, the systems and methods may determine that a turn has occurred where the change in cross-path angle across multiple tracks is greater than a first threshold $\Phi_1$ (which may be implemented either as a fixed value or a value dependent time or distance of the track). As noted above, iterative/recursive determination of the cross-path angle may enable adaptive windowing of a plurality of cross-path angle data points in a data set based on iterative/recursive changes in the cross-path angle. In the case of a turn being detected this may be implemented by discarding data points before the turn and including only subsequent data points in parameter calculations.

In some embodiments, a change in direction may not be so sever as to require discarding of data points. In such embodiments, the systems and methods may detect a curved path based on a change in cross-path angle across multiple tracks that is less than $\Phi_1$ but still greater than a second threshold $\Phi_2$ (which may again be implemented as either a fixed value or as a value dependent on time or distance of the track). In particular, a curve may be indicated so long as there is a monotonic increasing or decreasing in the parking angle estimation and the overall change is greater than $\Phi_2$ and less than $\Phi_1$. In order to better track a changing trajectory of the target object, is a curved trajectory is detected, the systems and methods may, in some embodiments, increase the sample frequency for the tracks. Alternatively, in other embodiments, a buffer size used for average or aggregate parameter determination may be decreased (e.g., fewer data points may be used in determining or verifying cross-path angle if a curve is detected). Thus, data smoothing may be reduced during detected changes in direction of the target vehicle. Note that the possible use of an adaptive buffer size, windowing of data points, and changing of sampling rates is reflected in step 530 of FIG. 5.

As noted above, in some embodiments, the systems and methods may further be configured (at step 570 of FIG. 5) for determining average/aggregate parameter values over a plurality of tracks. Thus, in some embodiments an average (global) cross-path angle may be determined based on aggregate data from multiple tracks. More particularly, when cross-path angle estimations from at least two independent tracks are available, a variation between an estimation of the cross-path angle for a first track and an estimation of the cross-path angle for a second track is calculated. If the variation is under a given threshold 13 (which may again be implemented as either a fixed value or as a value dependent on time or distance of the tracks) the data from the first and second tracks are considered as candidates for averaging. Once, a predetermined number (e.g., three) data points agree (e.g., cross-path angle estimations for three or more tracks are all within a predetermined variance of one another) an average parameter value (such as an average (global) cross-path angle) may be determined based on such data (e.g., based on averaging the cross-path angle estimations from each of these tracks). In this manner, independent data points are first validated relative to other data points and then averaged so as to increase the reliability thereof.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A cross-traffic alert system for a host vehicle, comprising:
an automotive proximity sensing detector mountable to a host vehicle and configured for tracking a relative position of a target object to the host vehicle over a first plurality of time points, where at any given time point, a trajectory of target object and a heading of the host vehicle intersect at a cross-path angle; and
a processor for receiving the digital signals and processing the digital signals to calculate the cross-path angle by solving an optimization problem which minimizes variance, across the first plurality time points, of a perpendicular path distance at each time point between a trajectory of target object and a common reference position (across the first plurality of time points) for the host vehicle.

2. The cross-traffic alert system of claim 1, wherein the processor is configured to determine whether a cross-traffic alert or other feedback should be triggered based at least partially on whether the target object is within a region of interest, wherein the region of interest is determined at least in part based on the calculated cross-path angle.

3. The cross traffic alert system of claim 1, wherein the optimization problem is solved as a multiple hypothesis problem, the multiple hypothesis problem supposing a plurality of possible cross-path angle solutions, each cross-path angle solution representing a corresponding possible trajectory for the target object.

4. The cross-traffic alert system of claim 3, wherein solving the multiple hypothesis problem includes: (i) for each of the first-plurality of time points, calculating for each of the plurality of possible cross-path angle solutions a corresponding perpendicular path distance between the corresponding possible trajectory for the target object at that time point and a reference position for the host vehicle, and (ii) determining an estimate for the cross-path angle based on selecting a cross-path angle solution from the plurality of possible cross path-angle solutions which minimizes a variance between the corresponding perpendicular path distances for each of the time points.

5. The cross traffic alert system of claim 1 wherein the processor is further configured to determine a shortest path distance between a reference position of the host vehicle and a trajectory of the target object as determined by the calculated cross-path angle.

6. The cross-traffic alert system of claim 3, wherein solving the multiple hypothesis problem includes: (i) for each of the first plurality of time points calculating for each of the plurality of possible cross-path angle solutions a corresponding perpendicular path distance between the corresponding possible trajectory for the target object at that time point and a reference position for the host vehicle, and (ii) for each of the plurality of possible cross-path angle solutions, determining a variance between the corresponding perpendicular path distances for each of the time points.

7. The cross-traffic alert system of claim 6, wherein the first plurality of time points includes a first time point and a second time point, wherein solving the multiple hypothesis problem includes (i) for the first time point, calculating for each of the plurality of possible cross-path angle solutions a corresponding perpendicular path distance between the corresponding possible trajectory for the target object at the first time point and the reference position for the host vehicle (ii) for the second time point, calculating for each of the plurality of possible cross-path solutions a corresponding perpendicular path distance between the corresponding possible trajectory for the target object at the second time point and the reference position for the host vehicle and (iii) for each of the plurality of possible cross-path angle solutions, determining a difference between the corresponding perpendicular path distance at the first time point and the corresponding perpendicular path distance at the second time point.

8. The cross-traffic alert system of claim 1 wherein the perpendicular path distances first plurality of time points are calculated after tracking data for each of the first plurality of time points is received.

9. The cross-path alert system of claim 6, wherein the variance information for the first plurality of time points is stored in a buffer after which the underlying perpendicular path distances are discarded from memory.

10. The cross-path alert system of claim 1 wherein the processor is further configured to recalculate the cross-path angle by solving an optimization problem which minimizes variance, across a second plurality of time points, of a perpendicular path distance at each time point in the second plurality of time points between a trajectory of target object and a common reference position (across the second plurality of time points) for the host vehicle.

11. The cross traffic alert system of claim 1 wherein the processor is further configured to determine whether a cross-traffic alert or other feedback should be triggered based at least partially on whether the target object is within a region of interest, wherein the region of interest is determined at least in part based on the calculated cross-path angle.

12. The cross traffic alert system of claim 1 wherein the host vehicle is stationary, wherein the reference position for the host vehicle is a constant position of the host vehicle.

13. The cross traffic alert system of claim 1 wherein the host vehicle is in motion with respect to the heading and wherein the reference position for the host vehicle is a common point of reference with known offsets relative to a position of the host vehicle at each of the time points.

14. The cross-traffic alert system of claim 1 wherein the automotive proximity sensing detector includes a radar transmitter for transmitting radar signals toward the target object and a radar receiver for receiving a plurality of returning radar signals reflected from the target object while tracking of the target object over the multiple time points, the radar transmitter and the radar receiver being mountable in the host vehicle.

15. A cross traffic alert system for a host vehicle, comprising:
an automotive proximity sensing detector mountable to a host vehicle and configured for tracking a relative position of target object to the host vehicle over multiple time points, where at any given time point, a trajectory of the target object and a heading of the host vehicle intersect at a cross-path angle; and
a processor configured for receiving and processing data from the automotive proximity sensing detector to determine the cross-path angle and to determine a shortest path distance between a position of the host vehicle and a trajectory of the target object as determined by the cross-path angle,
wherein the processor is configured to determine whether a cross-traffic alert or other feedback should be triggered based at least partially on the determined shortest path distance.

16. The cross-traffic alert system of claim 15, wherein the shortest path distance is determined as a projection of a distance between a position of the host vehicle and a position of the target object along an axis perpendicular to a trajectory of the target object as characterized by the cross-path angle, wherein the distance between the position of the host vehicle and the position of target object is determined based on a tracking range measurement.

17. The cross traffic alert system of claim 15 wherein the processor is configured to determine whether a cross-traffic alert or other feedback should be triggered based at least partially on the determined shortest path distance exceeding a threshold.

18. The cross traffic alert system of claim 17, wherein the threshold is fixed regardless of the cross-path angle.

19. The cross traffic alert system of claim 17, wherein the threshold is variable based on the cross-path angle.

20. The cross-traffic alert system of claim 15, wherein the automotive proximity sensing detector includes a radar transmitter for transmitting radar signals toward the target object and a radar receiver for receiving a plurality of returning radar signals reflected from the target object while tracking of the target object over the multiple time points, the radar transmitter and the radar receiver being mountable in the host vehicle.

21. A cross traffic alert system for a host vehicle, comprising:
an automotive proximity sensing detector mountable to a host vehicle and configured for tracking a relative position of target object to the host vehicle over multiple time points, where at any given time point, a trajectory of the target object and a heading of the host vehicle intersect at a cross-path angle; and
a processor configured for receiving and processing data from the automotive proximity sensing detector to determine the cross-path angle and to determine a lateral distance characterized by the perpendicular distance between a vector perpendicular to a trajectory of the target object, as determined by the cross-path angle, and a position of host vehicle, wherein the processor is configured to determine whether a cross-traffic alert or other feedback should be triggered based at least partially on the determined lateral distance for the target object.

22. The cross traffic alert system of claim 21, wherein the lateral distance is determined as a projection of a distance between a position of the host vehicle and a position of the target object along an axis parallel to a current trajectory of the target object as characterized by the cross-path angle, wherein the distance between the position of the host vehicle and the position of target object is determined based on a tracking range measurement.

23. The cross traffic alert system of claim 21, wherein the processor is further configured to determine a time to collision (TTC) for the target object based on the lateral distance and a velocity for the target object in a lateral distance direction.

24. The cross traffic alert system of claim 23, wherein the processor is configured to determine whether a cross-traffic alert or other feedback should be triggered based at least partially on the determined TTC for the target object.

25. The cross-traffic alert system of claim 21, wherein the automotive proximity sensing detector includes a radar transmitter for transmitting radar signals toward the target object and a radar receiver for receiving a plurality of returning radar signals reflected from the target object while tracking of the target object over the multiple time points, the radar transmitter and the radar receiver being mountable in the host vehicle.

* * * * *